US009157574B2

United States Patent
Nehls

(10) Patent No.: US 9,157,574 B2
(45) Date of Patent: Oct. 13, 2015

(54) FOLDED BEAM CLAMP

(71) Applicant: Charles Olen Nehls, Allen Park, MI (US)

(72) Inventor: Charles Olen Nehls, Allen Park, MI (US)

(73) Assignee: UNISTRUT INTERNATIONAL CORPORATION, Wayne, MI (US)

( * ) Notice: Subject to any disclaimer, the term of this patent is extended or adjusted under 35 U.S.C. 154(b) by 182 days.

(21) Appl. No.: 14/037,478

(22) Filed: Sep. 26, 2013

(65) Prior Publication Data

US 2015/0083876 A1  Mar. 26, 2015

(51) Int. Cl.
| | |
|---|---|
| *F16B 2/06* | (2006.01) |
| *F16M 13/02* | (2006.01) |
| *F16B 2/02* | (2006.01) |
| *F16L 3/00* | (2006.01) |
| *F16L 3/24* | (2006.01) |

(52) U.S. Cl.
CPC ................ *F16M 13/022* (2013.01); *F16B 2/02* (2013.01); *F16B 2/065* (2013.01); *F16L 3/00* (2013.01); *F16L 3/24* (2013.01)

(58) Field of Classification Search
CPC .......... F16B 2/065; F16B 37/045; F16L 3/24; F16L 3/11
USPC .......... 52/127.5, 127.12; 248/72, 228.3, 222.4
See application file for complete search history.

(56) References Cited

U.S. PATENT DOCUMENTS

| | | | | |
|---|---|---|---|---|
| 2,676,680 | A | * 4/1954 | Kindorf | 403/22 |
| 3,146,982 | A | * 9/1964 | Budnick | 248/68.1 |
| 3,232,393 | A | * 2/1966 | Attwood | 403/387 |
| 5,667,181 | A | * 9/1997 | van Leeuwen et al. | 248/343 |
| 2005/0230582 | A1 | 10/2005 | Birli et al. | |
| 2006/0214073 | A1 | 9/2006 | Mominee et al. | |

OTHER PUBLICATIONS

E Cable & Pipe Supports, E2675 or E2676 with E2675-1 or E2676-1 Application, http://www.ezystrut.com.au/products/beam-clamps/e2675-e2676-application/e2676-e2675-application/, Mar. 24, 2012.
Partial European Search Report mailed Mar. 23, 2015, from corresponding EP application No. 14186277.1.

* cited by examiner

*Primary Examiner* — Jeanette E Chapman
*Assistant Examiner* — Daniel Kenny
(74) *Attorney, Agent, or Firm* — Kacvinsky Daisak Bluni PLLC

(57) ABSTRACT

A clamp for overhead assemblies has a clamp portion including a frame with first and second spaced apart side portions connected at respective ends to a top portion. The first and second side portion can have first and second openings therethrough to form a clamp opening. A plate is disposed through third and fourth openings in the first and second spaced apart side portions, respectively. The plate includes a tapped recess for receiving a threaded rod. A screw is disposed in a tapped recess in the top portion. An engagement end of the screw is selectively extendible into the clamp opening to engage a structural member inserted within the clamp opening to couple the structural member to the threaded rod. A longitudinal axis of the screw is aligned with the tapped recess to eliminate eccentric loading of the clamp. A method of stocking clamps is also disclosed.

15 Claims, 8 Drawing Sheets

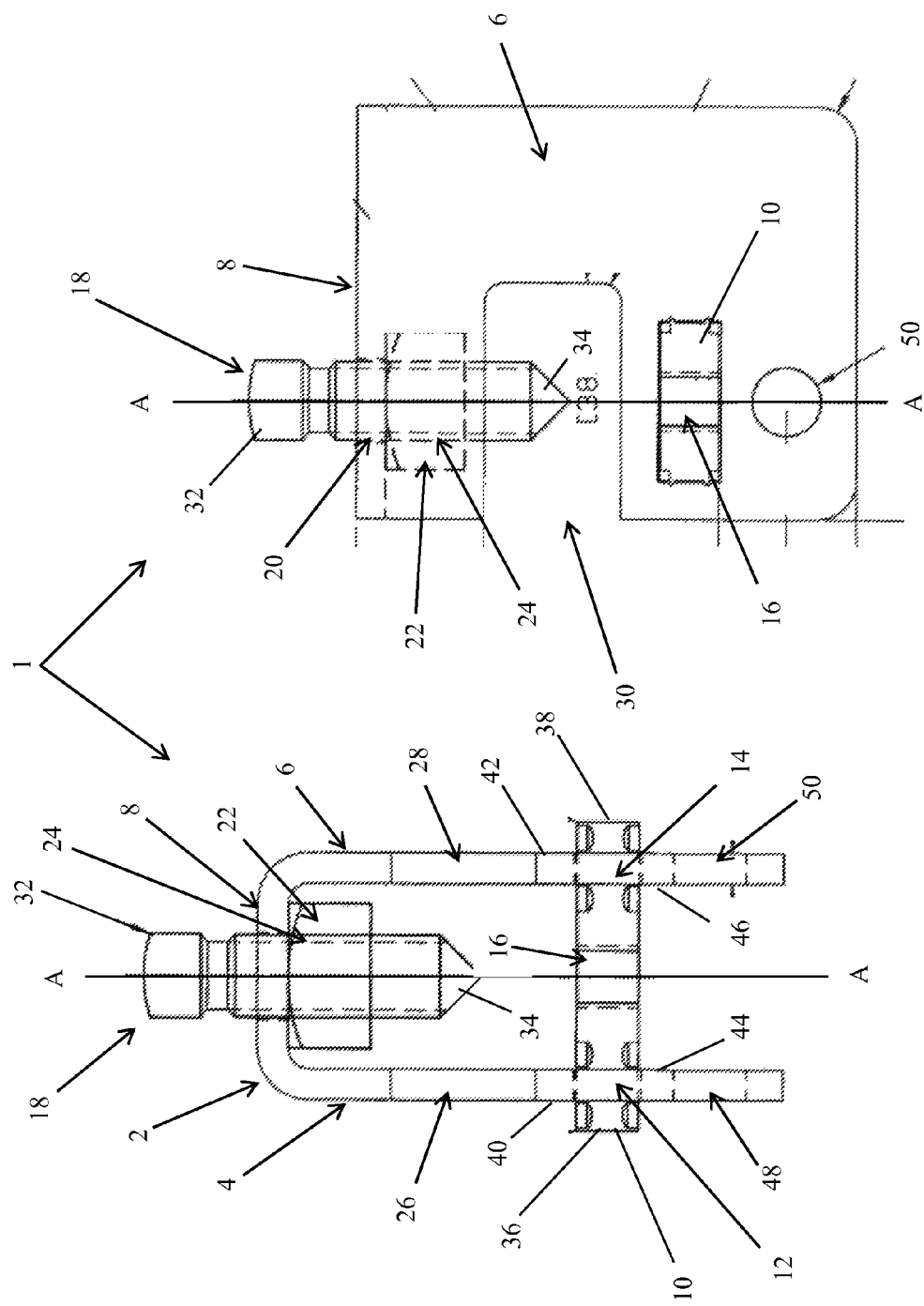

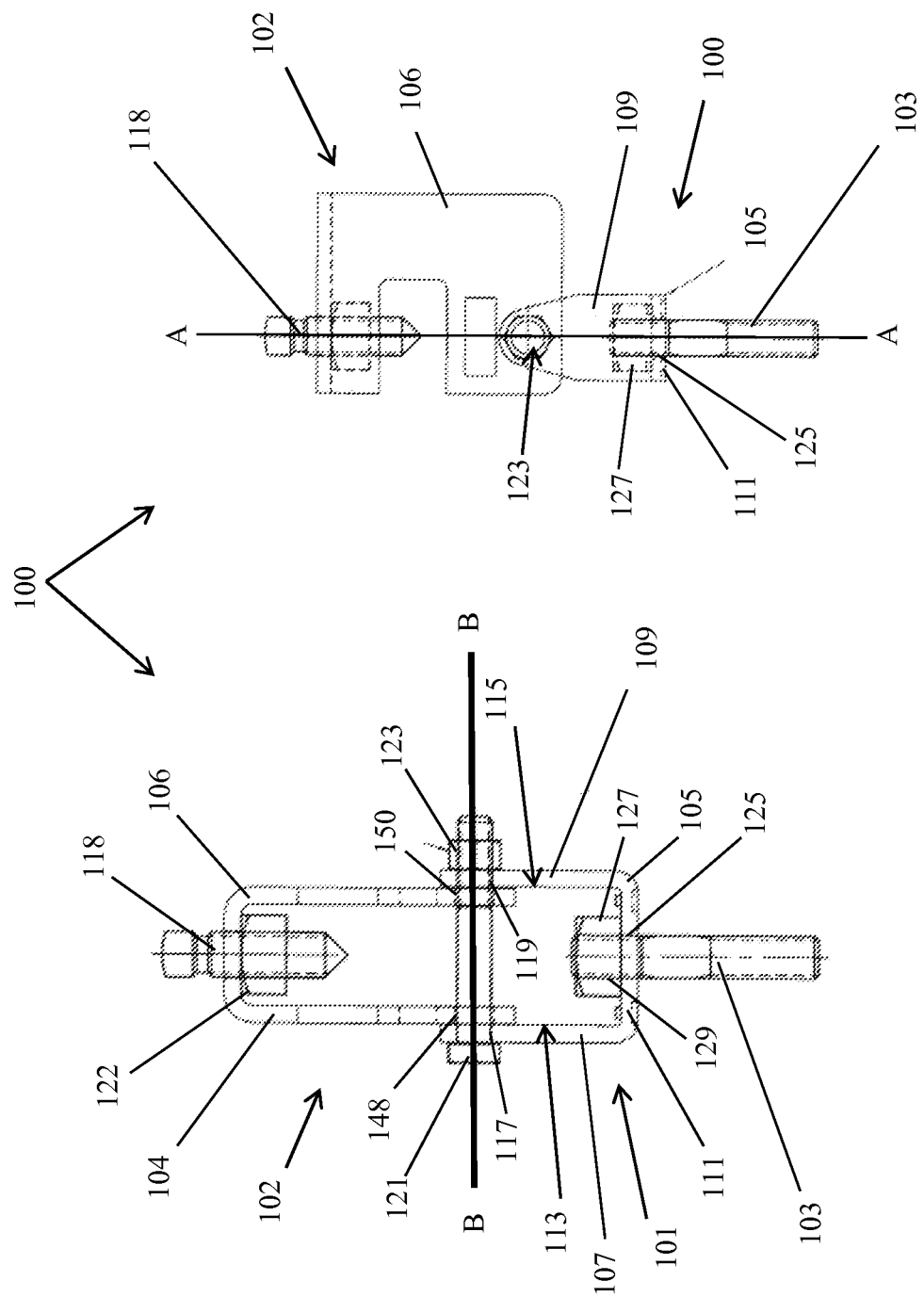

FOLDED BEAM CLAMP

BACKGROUND OF THE INVENTION

1. Field of the Disclosure

Embodiments of the invention generally relate to the field of mounting clamps, and more particularly to the field of clamps for use in rod hangers employed to secure loads to overhead structures.

2. Discussion of Related Art

It is desirable in many applications to clamp mounting assemblies to beams or girders in a buildings to provide resilient support structures for pipework and cabling. Often, clamps are secured to a beam or girder using a screw element that engages a portion of the beam or girder, along with a mounting rod extending downward from the clamp upon which a mounting can be secured to support the pipework or cabling.

Traditionally, clamps to be secured to girders or beams include cast elements which are drilled and tapped to threadably engage the drop rod, and a clamp mechanism for securing the clamp to the beam or girder. Such assemblies, however, are expensive to form and manufacture. In addition, these prior clamps are designed for use with specific size rods. This condition requires the manufacturer to build and stock multiple sizes of clamps. Another problem is that traditional clamps of this type are eccentrically loaded, such that the rod axis is offset with respect to the clamp axis as well as the point at which the clamp engages the overhead beam or girder. Such load eccentricity reduces the overall carrying capacity of prior clamps. Eccentric loading can also cause the clamp to rotate and slip off the flange of the beam to which it is attached.

In view of this, there is a need for an improved clamp design that overcomes the above-noted deficiencies in prior designs.

SUMMARY OF THE DISCLOSURE

A clamp for overhead assemblies is disclosed. The clamp can include a clamp portion comprising a frame having first and second spaced apart side portions connected at respective ends to a top portion. The first and second side portions may include first and second openings therethrough to form a clamp opening. A plate can be disposed through third and fourth openings in the first and second spaced apart side portions, respectively. The plate can include a tapped recess for receiving a threaded rod. A screw can disposed in a tapped recess in the top portion. An engagement end of the screw may be selectively extendible into the clamp opening to engage a structural member inserted within the clamp opening to couple the structural member to the threaded rod.

A clamp for overhead assemblies is disclosed. The clamp can include a clamp portion comprising a frame having first and second spaced apart side portions connected at respective ends to a top portion. The first and second side portions may include first and second openings therethrough to form a clamp opening. A screw may be disposed in a tapped recess in the top portion. An engagement end of the screw may be selectively extendible into the clamp opening to engage a structural member inserted within the clamp opening to couple the structural member to the threaded rod. The clamp may include a swivel assembly having a clevis portion having first and second spaced apart clevis plate portions joined at respective ends by a bottom clevis plate portion. The bottom clevis plate portion can have a tapped recess for receiving a threaded rod. The first and second spaced apart clevis plate portions may have corresponding first and second clevis plate openings positioned to align with third and fourth openings in the first and second side portions, and to receive a fastener therethrough to rotatably engage the clamp portion to the swivel assembly.

A method of providing a clamp for overhead assemblies is disclosed. The method may include: stocking a first quantity of clamp portions, each of the clamp portions comprising: a frame having first and second spaced apart side portions connected at respective ends to a top portion, the first and second side portion comprising first and second openings therethrough to form a clamp opening for receiving a structural member therein, the first and second spaced apart side portions further comprising third and fourth openings; and a screw disposed in a tapped recess in the top portion, an engagement end of the screw being selectively extendible into the clamp opening to engage the structural member to couple the structural member to the threaded rod; and stocking a second quantity of tapped plates, each of the tapped plates configured to engage the frame via the third and fourth openings in the first and second spaced apart members, each of the tapped plates having a tapped recess sized to receive a threaded rod of a predetermined size, wherein the second quantity is greater than the first quantity, and wherein at least first and second tapped plates of the second quantity of tapped plates tapped recesses of different sizes; selecting one tapped plate from the second quantity of tapped plates, wherein the selected tapped plate has a tapped recess configured to receive a predetermined size threaded rod; and engaging the selected one tapped plate with the third and fourth openings of the clamp portion to form a clamp configured to engage the preselected threaded rod.

BRIEF DESCRIPTION OF THE DRAWINGS

The accompanying drawings illustrate preferred embodiments of the disclosed device so far devised for the practical application of the principles thereof, and in which:

FIG. 1 is an end view of an exemplary embodiment of the disclosed clamp;

FIG. 2 is a side view of the clamp of FIG. 1;

FIG. 4 is an end view of another exemplary embodiment of the disclosed clamp;

FIG. 5 is a side view of the clamp of FIG. 4;

DESCRIPTION OF EMBODIMENTS

An improved clamp design is disclosed which overcomes the various deficiencies in prior designs. Specifically, the disclosed clamp design provides an improved degree of commonality so that numerous different sizes of clamps need no longer be held in stock. In addition, the disclosed design includes a tapped recess precisely in line with the clamping screw used to engage the beam clamp from above, thus eliminating load eccentricity.

Figure 3:
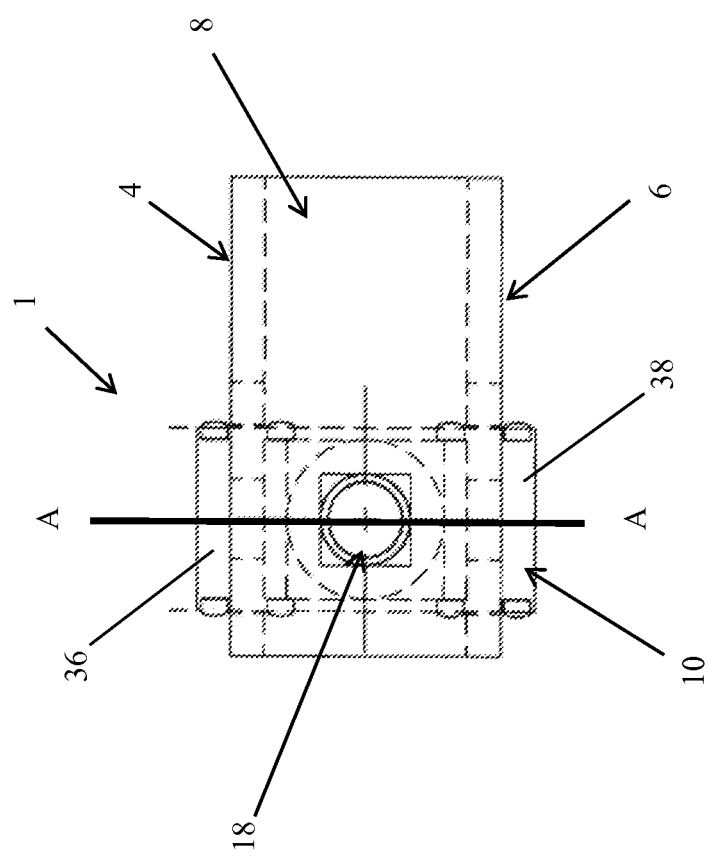
FIG. 3 is a top view of the clamp of FIG. 1.

Referring to FIGS. 1-3, clamp 1 includes a frame 2 having first and second spaced apart side portions 4, 6 connected at respective ends by a top portion 8 to form a U-shape. A tapped plate 10 is disposed within first and second openings 12, 14 in the first and second spaced apart side portions 4, 6, respectively. The tapped plate 10 includes a tapped recess 16 for receiving a suitably sized threaded rod (not shown) therein. A clamping screw 18 is disposed in a tapped recess 20 in the top portion 8 of the frame 2. A nut 22 is positioned within the frame 2 adjacent the tapped recess 20 and receives a threaded portion 24 of the clamping screw 18.

As shown in FIG. 2, the first and second spaced apart side portions 4, 6, of the frame 2 comprise respective cutouts 26, 28 that form a clamp opening 30 for receiving the flange of a support beam or support member to which the clamp 1 attach in use. The clamping screw 18 has an actuation end 32 disposed outside the frame 2 and a clamping end 34 disposed inside the frame such that the clamping end 34 is selectively extendible into the clamp opening 30. The clamping end 34 of the clamping screw 18 comprises a point configured to engage the flange of a support beam or support member. The actuation end 32 of the clamping screw 18 includes a square, hex or other geometric shape suitable for gripping by hand, or by a hand tool. In use, the clamping screw 18 may be rotated so that the clamping end 34 is sufficiently recessed with respect to the clamp opening 30 to enable the clamp 1 to be fit onto the flange of a support beam or support member. When properly positioned, the clamping screw 18 can be rotated in the opposite direction so that the clamping end 34 extends into the clamp opening sufficiently to engage the flange of the support beam or support member. A hand tool can be used to engage with the actuation end 32 to apply a desired torque to the clamping screw 18 to fix the screw and clamp 2 to the support beam or support member.

As noted, the first and second spaced apart side portions 4, 6 of the frame 2 include first and second openings 12, 14 for receiving the tapped plate 10. As can be seen in FIG. 1, the tapped plate 10 has first and second ends 36, 38 which, when the tapped plate is engaged with the first and second openings 12, 14, extend beyond the outside surfaces 40, 42 of the first and second spaced apart side portions 4, 6 of the frame 2. In the illustrated embodiment, this configuration enables the tapped plate 10 to be crimped to the first and second spaced apart side portions 4, 6 adjacent the respective outside surfaces 40, 42 and inside surfaces 44, 46 of the first and second side portions. As will be appreciated, crimping the tapped plate 10 in sixteen locations (eight interior to the frame 2 and eight exterior to the frame), closes the frame 2 into a rectangular, tubular profile that exhibits high strength and rigidity when compared to open profiles exemplified by the prior art.

As can be seen in FIGS. 1-3, the clamp 1 aligns the axis A-A of the clamping screw 18 with the tapped recess 16 in the tapped plate 10 so that the clamping axis and the threaded rod axis (which will be received in the tapped recess 16) are coaxial. Thus, loads applied to the clamp 1 by the threaded rod will be directly applied along the axis A-A to the engagement point between the clamping screw 18 and the flange of the support beam or support member. As previously described, this coaxial alignment eliminates loading eccentricity, thereby improving clamp strength and performance.

Also shown in FIGS. 1 and 2, the clamp 1 can include third and fourth openings 48, 50 for receiving one or more fasteners to couple the clamp 1 to a swivel assembly, as will be described in greater detail later.

In practice, the frame 2, clamping screw 18 and nut 22 can be manufactured and stocked in relatively large quantity, as they can be used with any of a variety of different threaded rod sizes. The tapped plate 10, however, may be manufactured and stocked in a variety of different configurations. Specifically, quantities of tapped plates 10 having different tapped recess 16 sizes corresponding to different threaded rod sizes may be manufactured and stocked separately from the frame 2, clamping screw 18 and nut 22. When an order is placed for a quantity of clamps suitable for a particular size rod, tapped plates 10 having tapped recesses 16 matching the particular rod size can be fit and crimped to respective frames 2 to produce clamps 1 configured to fit the particular rod. As will be appreciated, this is an advantage because fewer frames 2, screws 18 and nuts 22 need to be fabricated and stocked to meet incoming demand for clamps 1. In some embodiments, a part number for each finished clamp 1 is located on the tapped plate 10. Not until final assembly is made, when the tapped plate is crimped to the frame 2, that the completed assembly becomes a unique part number.

Referring now to FIGS. 4 and 5, an embodiment of the disclosed clamp 100 is shown which incorporates a swivel assembly 101 to enable the clamp to engage a threaded rod 103 at a variety of angles. Thus, clamp 100 may be advantageous in the event the flange of the support beam or support member is not parallel to the floor, or where the load supported by the threaded rod is not induced normal to the flange.

The clamp 100 of this embodiment can include some or all of the features of the clamp 1 of FIGS. 1-3, with the exception that clamp 100 may not include a tapped plate positioned between the first and second plate portions of the frame for engaging a threaded rod. Instead, clamp 100 includes swivel assembly 101 which rotatably engages the frame 102 via third and fourth openings 148, 150 in the first and second plate portions 104, 106 of the frame. The swivel assembly 101 may comprise a clevis portion 105 having first and second spaced-apart clevis plate portions 107, 109 joined together at respective ends by a bottom clevis plate portion 111 to form a general U-shape. The first and second clevis plate portions 107, 109 may be spaced apart by a distance sufficient that respective inside surfaces 113, 115 of the first and second clevis plate portions can receive the first and second plate portions 104, 106 of the frame 102 therebetween. The first and second clevis plate portions 107, 109 may include first and second clevis plate openings 117, 119 configured to align with the third and fourth openings 148, 150 of the first and second plate portions 104, 106. A fastener 121, which in the illustrated embodiment is a cap screw, may be received through the first and second clevis plate openings 117, 119 and the third and fourth openings 148, 150 of the first and second plate portions 104, 106 to couple the frame 102 to the clevis portion 105 of the swivel assembly 101. A nut 123 may engage the fastener 121 to selectively fix the positions of the clevis portion 105 and the frame 102.

The bottom clevis plate portion 111 may include a tapped recess 125 sized to receive the threaded rod 103 therein. A nut 127 may be positioned within the clevis portion 105 adjacent the tapped recess 125 to receive a threaded portion 129 of the threaded rod 103 to fix the threaded rod axially in one direction with respect to the clamp 100.

Thus arranged, the clamp 100 aligns the axis A-A of the clamping screw 118 with the tapped recess 125 in the bottom clevis plate portion 111 so that the clamping axis and the axis of the threaded rod 103 are coaxial. As such, loads applied to the clamp 100 by the threaded rod 103 will be directly applied along the axis A-A to the engagement point between the clamping screw 118 and the flange of the support beam or support member. As with the previous embodiment, this coaxial alignment eliminates loading eccentricity, thereby improving clamp strength and performance.

Figure 6:
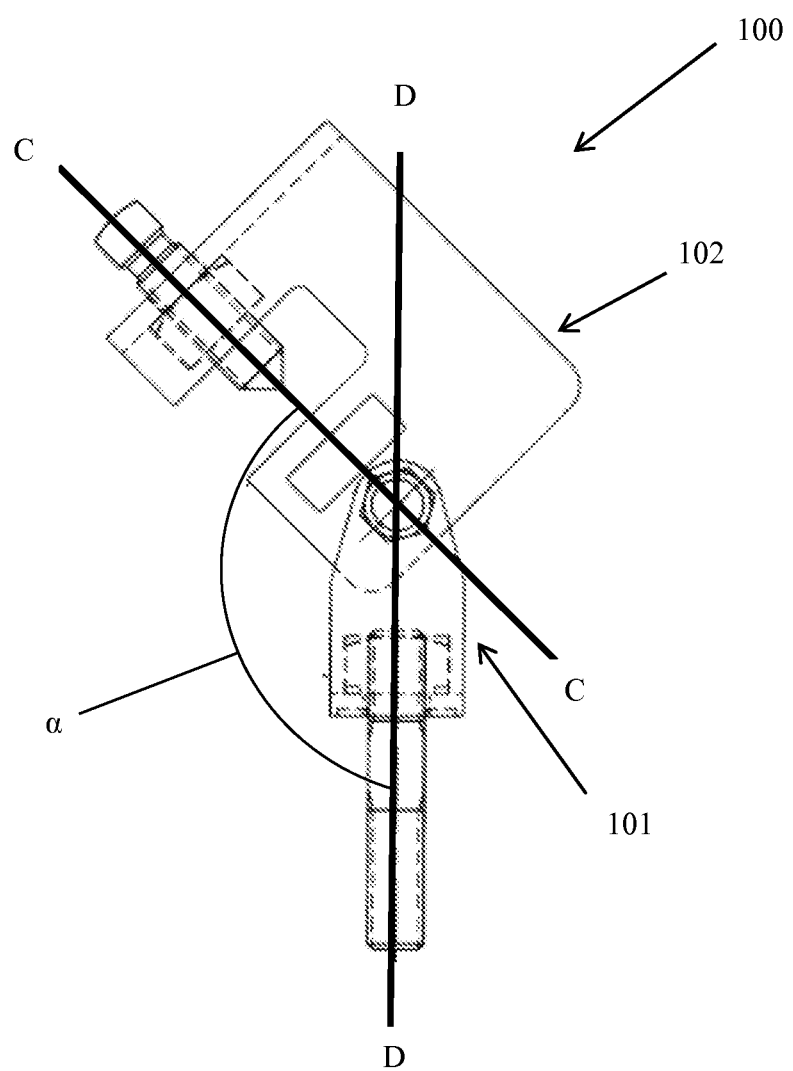
FIG. 6 is a side view of the clamp of FIG. 4 swiveled in a first position.
Figure 7:
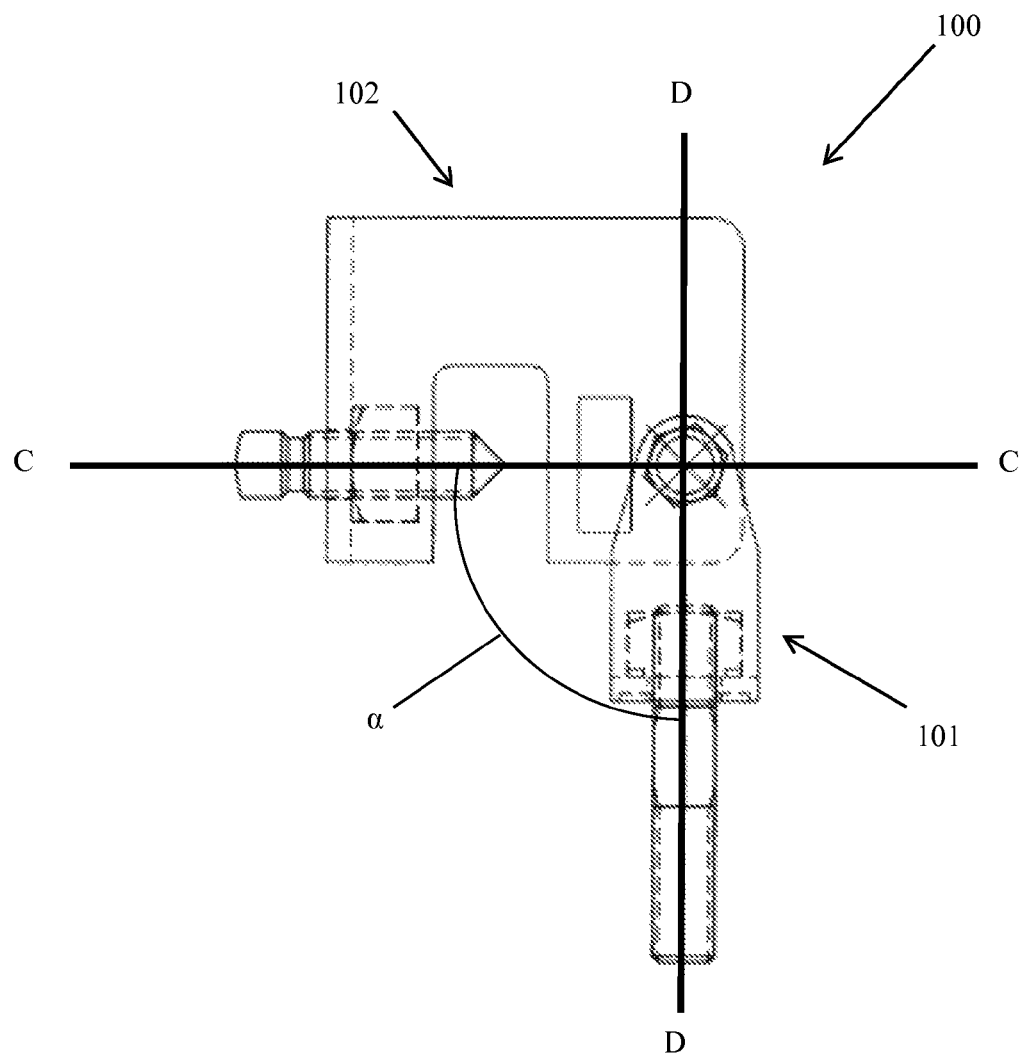
FIG. 7 is a side view of the clamp of FIG. 4 swiveled in a second position.

As can be seen in FIG. 4, the swivel assembly 101 has a swivel axis B-B defined by the longitudinal axis of the fastener 121. In the position shown in FIGS. 4 and 5, the swivel axis B-B is orthogonal to axis A-A. To accommodate instances in which the flange of the support beam or support member is not parallel to the floor, or where the load supported by the threaded rod is not induced normal to the flange, the frame 102 can be rotated about the fastener 121 so that the axis C-C of the clamping screw 118 (FIG. 6) is oriented at an angle "α" with respect to the axis D-D of the threaded rod. As can be seen, the frame 102 is rotatable from a position in which the axes C-C and D-D align with axis A-A (FIG. 5), through and including the positions shown in FIGS. 6 and 7, in which the angle "α" is approximately 135-degrees and 90-degrees, respectively. It will be appreciated that the frame 102 can be rotated to any position within the range of "α"=180-degrees (FIG. 5, in which axes C-C and D-D align along axis A-A) to "α"=90-degrees (FIG. 7). Once the swivel assembly 101 is adjusted to the desired position with respect to the clamp 102, the fastener 121 and nut 123 can be tightened to lock the swivel assembly and clamp in the desired angular orientation.

In practice, the frame 102, clamping screw 118, nuts 122, 123 and fastener 121 can be manufactured and stocked in relatively large quantity, as they can be used with any of a variety of different threaded rod sizes. The swivel assembly 101 however, may be manufactured and stocked in a variety of different configurations. Specifically, quantities of swivel assemblies 101 having different sizes tapped recess 125 corresponding to different threaded rod sizes may be manufactured and stocked separately from the frame 102, clamping screw 118 and nut 122. When an order is placed for a quantity of clamps suitable for a particular size rod, swivel assemblies 101 having tapped recesses 125 matching the particular rod size can be fit and engaged to respective frames 102 via fasteners 121 to produce clamps 100 configured to fit the particular rod. As will be appreciated, this is an advantage because fewer frames 102, screws 118, nuts 122, 123 and fasteners 121 need to be fabricated and stocked to meet incoming demand for clamps 100.

In some embodiments, a part number for each finished clamp 100 is located on the swivel assembly 101. Not until final assembly is made, when the swivel assembly 101 is fit to the frame 2, that the completed assembly becomes a unique part number.

Referring now to FIGS. 8-11, an embodiment of the disclosed clamp 200 is shown which incorporates a swivel assembly 201 to enable the clamp to engage a threaded rod 203 at a variety of angles in a manner similar to that described in relation to the clamp 100 described in relation to FIG. 4. The difference, however, is that clamp 200 enables relative rotation of the frame 202 and the swivel assembly 201 in a plane orthogonal to that of clamp 100. Thus, as with clamp 100, clamp 200 may be advantageous in the event the flange of the support beam or support member is not parallel to the floor, or where the load supported by the threaded rod is not induced normal to the flange.

The clamp 200 of this embodiment can include some or all of the features of the clamp 1 of FIGS. 1-3. In addition, clamp 200 may include a swivel assembly 201 that enables the clamp to rotate with respect to threaded rod 203.

The clamp 200 may have a frame portion 202 that includes a tapped plate 210 disposed between first and second side portions 204, 206 (FIG. 8) in the same manner as described in relation to the FIG. 1. The frame portion 202 may further include a clevis portion 230 engaged with the tapped plate 210. The clevis portion 230 may include first and second spaced-apart clevis plate portions 232, 234 joined together at respective ends by a top clevis plate portion 236 to form a general U-shape. As shown, the clevis portion 230 is inverted and "hung" over the tapped plate 210 so that the top clevis plate portion 236 engages the tapped plate and the first and second spaced-apart clevis plate portions 232, 234 depend downward. In some embodiments, the top clevis plate portion 236 is fixed to the tapped plate 201, such as by crimping or other suitable connection technique.

The clevis portion includes first and second openings 238, 240 in respective first and second clevis plate portions 232, 234. A swivel assembly 201 rotatably engages the clevis via these first and second openings 238, 240. The swivel assembly 201 may comprise a swivel clevis portion 205 having first and second spaced-apart swivel clevis plate portions 207, 209 joined together at respective ends by a bottom swivel clevis plate portion 211 to form a general U-shape. The first and second swivel clevis plate portions 207, 209 may be spaced apart so that the first and second openings 238, 240 align with first and second swivel clevis plate openings 217, 219 in the first and second swivel clevis plate portions 207, 209. A fastener 221, which in the illustrated embodiment is a cap screw, may be received through the openings 217, 238, 219, 240 to couple the clevis portion 230 and frame 202 to the swivel clevis portion 205 of the swivel assembly 201. A nut 223 may engage the fastener 221 to selectively fix the positions of the swivel clevis portion 205 and the clevis portion 230/frame 202.

The bottom swivel clevis plate portion 211 may include a tapped recess 225 sized to receive the threaded rod 203 therein. A nut 227 may be positioned within the swivel clevis portion 205 adjacent the tapped recess 225 to receive a threaded portion 229 of the threaded rod 203 to fix the threaded rod 203 axially in one direction with respect to the clamp 100.

Figure 9:
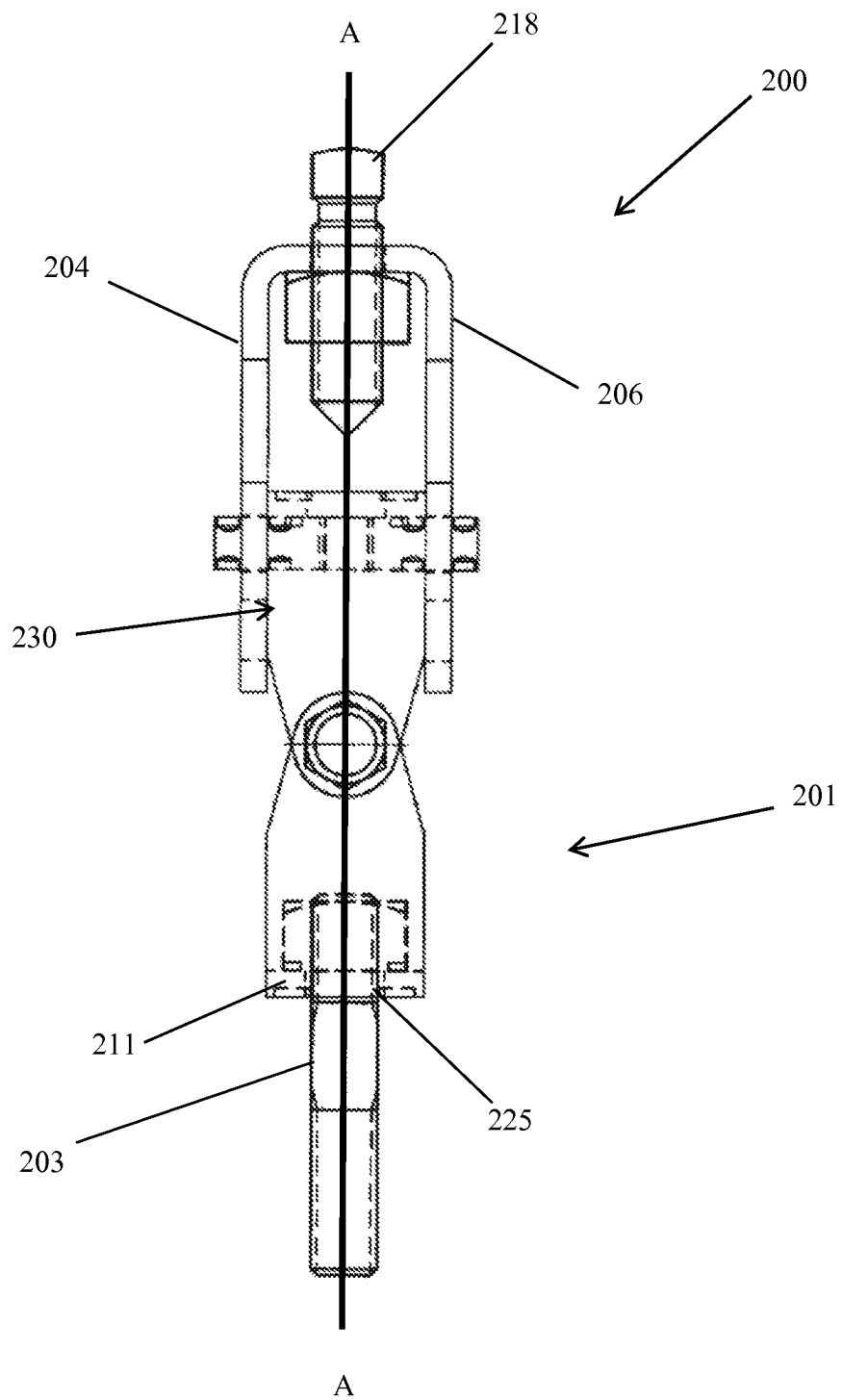
FIG. 9 is an end view of the clamp of FIG. 8.

As can be seen in FIG. 9, the clamp 200 aligns the axis A-A of the clamping screw 218 with the tapped recess 225 in the bottom swivel clevis plate portion 211 so that the clamping axis and the axis of the threaded rod 203 are coaxial. As such, loads applied to the clamp 200 by the threaded rod 203 will be directly applied along the axis A-A to the engagement point between the clamping screw 218 and the flange of the support beam or support member. As with the previous embodiment, this coaxial alignment eliminates loading eccentricity, thereby improving clamp strength and performance.

Figure 8:
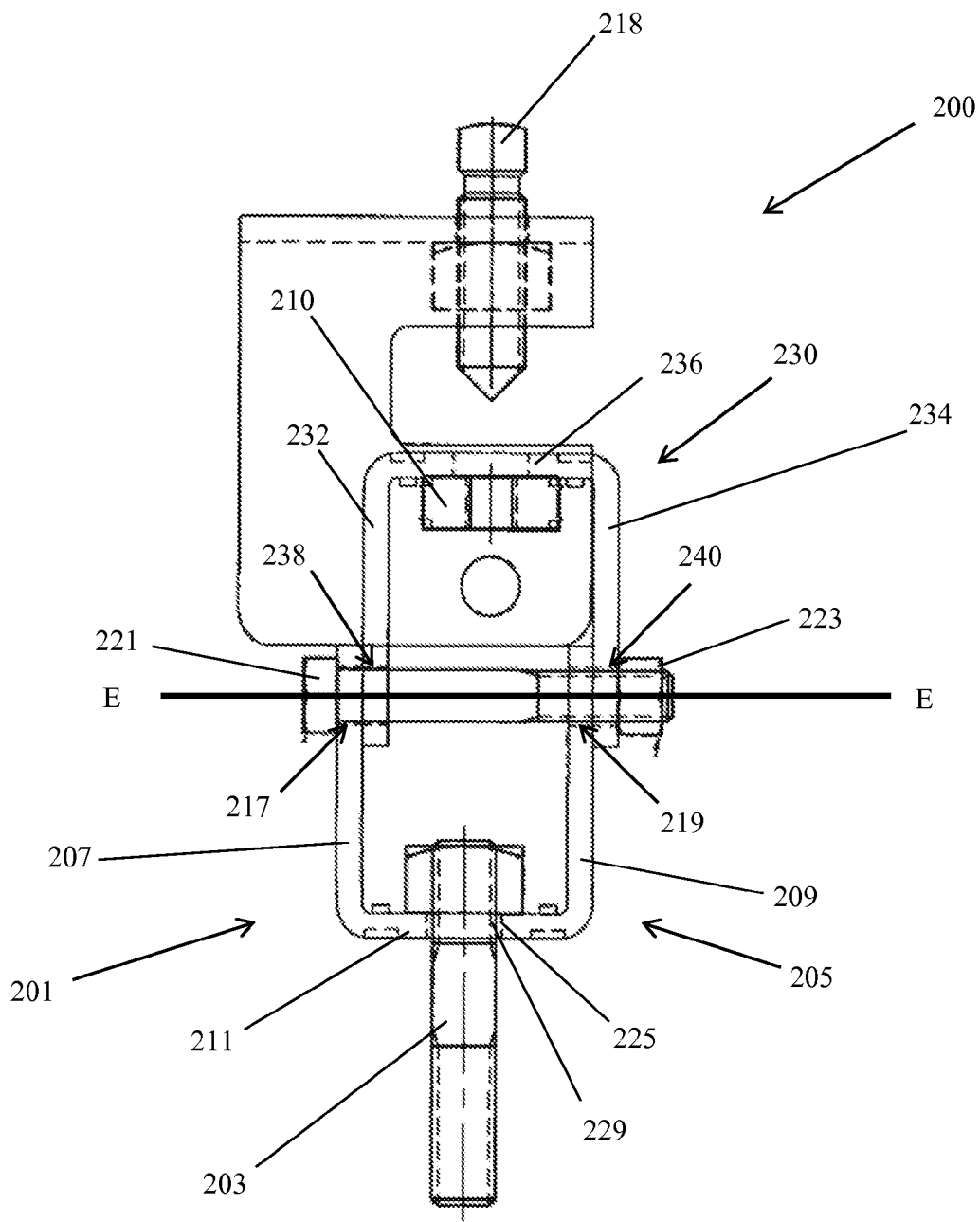
FIG. 8 is a side view of a further exemplary embodiment of the disclosed clamp.
Figures 10, 11:
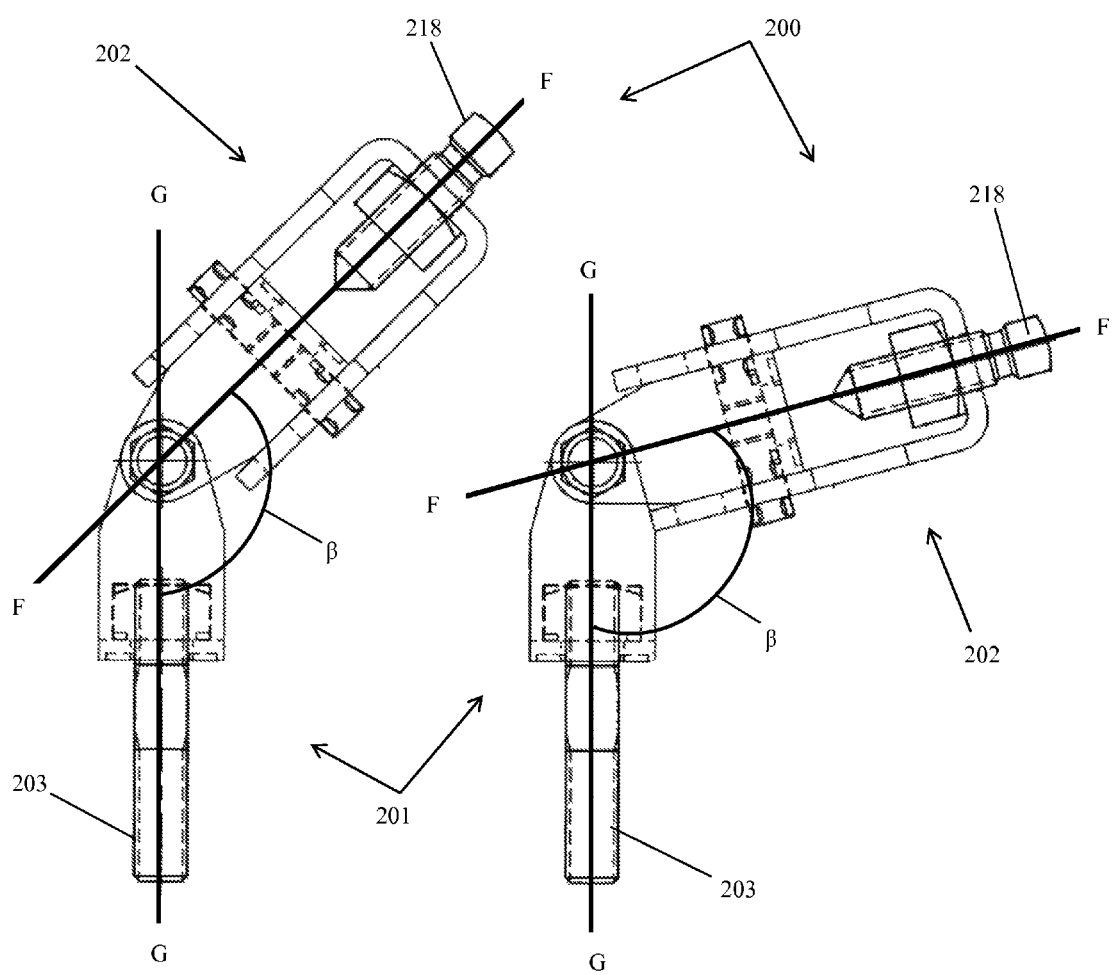
FIG. 10 is an end view of the clamp of FIG. 8 swiveled in a first position.
FIG. 11 is an end view of the clamp of FIG. 8 swiveled in a second position.

As can be seen in FIG. 8, the swivel assembly 201 has a swivel axis E-E defined by the longitudinal axis of the fastener 221. In the position shown in FIGS. 8 and 9, the swivel axis E-E is orthogonal to axis A-A. To accommodate instances in which the flange of the support beam or support member is not parallel to the floor, or where the load supported by the threaded rod is not induced normal to the flange, the frame 202 and clevis portion 230 can be rotated about the fastener 221 so that the axis F-F of the clamping screw 218 (FIG. 10) is oriented at an angle "β" with respect to the axis G-G of the threaded rod 203. As can be seen, the frame 202 is rotatable from a position in which the axes F-F and G-G align with axis A-A (see FIG. 9), through and including the positions shown in FIGS. 10 and 11, in which the angle "β" is approximately 135-degrees and 105-degrees, respectively. It will be appreciated that the frame 202 and clevis portion 230 can be rotated to any position within the range of "β"=180-degrees (FIG. 9, in which axes F-F and G-G align along axis A-A) to "β"=105-degrees (FIG. 11). Once the swivel assembly 201 is adjusted to the desired position with respect to the clamp 202 and clevis portion 230, the fastener 221 and nut 223 can be tightened to lock the swivel assembly and clamp in the desired angular orientation.

In practice, the frame 202, clamping screw 218, nuts 222, 223, fastener 221 and tapped plate 210 can be manufactured and stocked in relatively large quantity, as they can be used with any of a variety of different threaded rod sizes. The swivel assembly 201 however, may be manufactured and stocked in a variety of different configurations. Specifically, quantities of swivel assemblies 201 having different tapped recess 225 sizes corresponding to different threaded rod sizes may be manufactured and stocked separately from the frame 202, clamping screw 218, nuts 222, 223, fastener 221 and tapped plate 210. When an order is placed for a quantity of clamps suitable for a particular size rod, swivel assemblies 201 having tapped recesses 225 matching the particular rod size can be fit and engaged to respective frames 202 and clevis portions 230 via fasteners 221 to produce clamps 200 configured to fit the particular rod. As will be appreciated, this is an advantage because fewer frames 202, screws 218, nuts 222, 223, fasteners 221 and tapped plates 210 need to be fabricated and stocked to meet incoming demand for clamps 200.

In some embodiments, a part number for each finished clamp 200 is located on the swivel assembly 201. Not until final assembly is made, when the swivel assembly 201 is fit to the frame 202 and clevis portion 230, that the completed assembly becomes a unique part number.

As will be appreciated, the disclosed design provides an improved degree of commonality so that multiple sizes of clamps need no longer be stocked. Thus, a single frame size can be used for several sizes of rod drops. During the manufacturing process, clamp frames can be produced to inventory without being designated to a particular rod drop size. The clamp frame can be common to all sizes of rod drops, and as such it can be a shared component not requiring separate stock keeping units (sku's) to be maintained in finished goods. It is not until the tapped plate (or swivel assembly) is engaged with the associated frame that the clamp assembly becomes a finished good product. Through this process, inventories are permitted to be maintained at a lower finished good level, and excess and obsolete inventories of a particular size can be eliminated.

In use, the clamp may be installed along the length of a building beam or truss in a perpendicular attitude to the axis of the beam. To secure the clamp to the beam or truss, the clamp receives the flange of the beam into the cut-out area in the clamp frame. Final attachment to the beam flange is provided by the tightening of the screw on to the top of the flange beam. The engagement of the screw point securely connects the beam clamp to the beam flange (upper or lower). A ½"×1½" long screw can be provided for this purpose. To receive the screw, a ½" square nut is provided pre-assembled with the screw. All-thread rod is typically used to provide a means of attachment for electrical or mechanical conduit and pipe trapezes which are a typical application. Based upon the required load for the attachment(s), one of several, various diameter all-thread rods may be employed. The customer can thread the all-thread rod into the base of the tapped plate from below the clamp thus providing a means of attachment for the trapeze. The frame of the clamp is also provided with two axially aligned recesses in adjacent sides of the clamp frame. These recesses are provided to allow a swivel connection in the event that the beam flanges are not parallel to the floor or the load is not induced normal to the beam flange. For embodiments incorporating a swivel connection, the all-thread rod can be threaded into a tapped recess in a bottom plate portion of the swivel connection.

While the clamp has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed is:

1. A clamp for overhead assemblies, comprising:
a clamp portion comprising a frame having first and second spaced apart side portions connected at respective ends to a top portion, the first and second side portion comprising first and second openings therethrough to form a clamp opening;
a plate disposed through third and fourth openings in the first and second spaced apart side portions, respectively, the plate including a tapped recess for receiving a threaded rod;
a screw disposed in a tapped recess in the top portion, an engagement end of the screw being selectively extendible into the clamp opening to engage a structural member inserted within the clamp opening to couple the structural member to the threaded rod;
a clevis portion having first and second spaced apart clevis plate portions joined at respective ends by a top clevis plate portion, the top clevis plate portion engaged with the plate, the first and second clevis plate portions having first and second openings for engaging a swivel assembly;
the swivel assembly comprising a swivel clevis portion having first and second spaced apart swivel clevis plate portions joined at respective ends by a bottom swivel clevis plate portion the first and second swivel clevis plate portions comprising first and second swivel clevis plate openings; and
a fastener disposed in the first and second openings of the clevis portion and the first and second swivel clevis plate openings of the swivel clevis portion;
wherein the swivel assembly is rotatable with respect to the clamp about a longitudinal axis of the fastener; and
wherein the bottom swivel clevis plate portion comprises a tapped hole for receiving a threaded rod.

2. The clamp of claim 1, wherein first and second ends of the plate extend through the third and fourth openings, and the plate is crimped adjacent to the third and fourth openings to fix the plate to the clamp portion, thereby closing the frame into a rectangular tubular profile.

3. The clamp of claim 1, wherein a longitudinal axis of the screw is coaxial with the tapped recess of the plate such that a clamping axis of the clamp and a longitudinal axis of the threaded rod are coaxial whereby loads applied to the clamp by the threaded rod are directed applied along the clamping axis, without load eccentricity.

4. The clamp of claim 1, wherein the bottom swivel clevis plate portion is rotatable between a first position in which the tapped hole of the bottom swivel clevis plate is aligned with a longitudinal axis of the screw, and a second axis in which the tapped hole of the bottom swivel clevis plate is oriented at an angle θ with respect to the longitudinal axis of the screw.

5. The clamp of claim 4, wherein β is between 180-degrees and 105-degrees.

6. The clamp of claim 4, wherein the swivel assembly is selectively fixable to the clamp at a desired position by tightening the fastener.

7. The clamp of claim 1, further comprising a first nut positioned adjacent the top portion of the frame for receiving a threaded portion of the screw.

8. A clamp for overhead assemblies, comprising:
a clamp portion comprising a frame having first and second spaced apart side portions connected at respective ends to a top portion, the first and second side portion comprising first and second openings therethrough to form a clamp opening;
a screw disposed in a tapped recess in the top portion, an engagement end of the screw being selectively extendible into the clamp opening to engage a structural member inserted within the clamp opening to couple the structural member to the threaded rod;
a swivel assembly comprising a lower clevis portion having first and second spaced apart clevis plate portions joined at respective ends by a bottom clevis plate portion, the bottom clevis plate portion having a tapped hole for receiving a threaded rod; and
an upper clevis portion having third and fourth spaced apart clevis plate portions joined at respective ends by a top clevis plate portion, the top clevis plate portion being engaged with the clamp portion;
wherein the first, second, third and fourth spaced apart clevis plate portions have corresponding first second, third and fourth clevis plate openings positioned to receive a fastener therethrough to rotatably engage the upper clevis portion to the lower clevis portion.

9. The clamp of claim 8, wherein a longitudinal axis of the screw is coaxial with the tapped hole of the bottom clevis plate portion such that a clamping axis of the clamp and a longitudinal axis of the threaded rod are coaxial whereby loads applied to the clamp by the threaded rod are directed applied along the clamping axis, without load eccentricity.

10. The clamp of claim 8, wherein the swivel is rotatable between a first position in which the tapped hole of the bottom clevis plate portion is aligned with a longitudinal axis of the screw, and a second axis in which the tapped hole is oriented at an angle a with respect to the longitudinal axis of the screw.

11. The clamp of claim 10, wherein a is between 180-degrees and 90-degrees.

12. The clamp of claim 8, wherein the swivel assembly is selectively fixable to the clamp at a desired position by tightening the fastener.

13. The clamp of claim 8, further comprising a first nut positioned adjacent the top portion of the frame for receiving a threaded portion of the screw, and a second nut positioned adjacent a top surface of the bottom clevis plate portion for receiving a threaded portion of the threaded rod.

14. A method of providing a clamp for overhead assemblies, comprising:
stocking a first quantity of clamp portions, each of the clamp portions comprising:
a frame having first and second spaced apart clevis side portions connected at respective ends to a top clevis plate portion, the first and second clevis side portion comprising first and second openings therethrough to form a clamp opening for receiving a structural member therein, the first and second spaced apart side portions further comprising third and fourth openings; and
a screw disposed in a tapped recess in the top clevis plate portion, an engagement end of the screw being selectively extendible into the clamp opening to engage the structural member to couple the structural member to the threaded rod; and
stocking a second quantity of tapped plates, each of the tapped plates configured to engage the frame via the third and fourth openings in the first and second spaced apart members, each of the tapped plates having comprising third and fourth spaced apart clevis side portions connected to a bottom clevis plate portion comprising a tapped recess sized to receive a threaded rod of a predetermined size, wherein the second quantity is greater than the first quantity, and wherein at least first and second tapped plates of the second quantity of tapped plates tapped recesses of different sizes;
selecting one tapped plate from the second quantity of tapped plates, wherein the selected tapped plate has a tapped recess configured to receive a predetermined size threaded rod; and
engaging the selected one tapped plate with the third and fourth openings of the clamp portion to form a clamp configured to engage the preselected threaded rod.

15. The method of claim 14, wherein stocking a second quantity of tapped plates comprises stocking a plurality of tapped plates each having tapped recesses of different sizes.

* * * * *